United States Patent [19]

Willis

[11] 4,151,507
[45] Apr. 24, 1979

[54] VEHICLE ALARM SYSTEM

[76] Inventor: Billy R. Willis, 13135 Vanowen St., Apt. 5, North Hollywood, Calif. 91605

[21] Appl. No.: 822,698

[22] Filed: Aug. 8, 1977

[51] Int. Cl.² .............................................. B60R 25/10
[52] U.S. Cl. ........................................ 340/64; 340/65; 307/10 AT; 180/114
[58] Field of Search ............................ 340/63, 64, 65; 307/10 AT; 180/114

[56] References Cited

U.S. PATENT DOCUMENTS 3,930,226  12/1975  Plumberg ................................ 340/64

Primary Examiner—Alvin H. Waring
Attorney, Agent, or Firm—Poms, Smith, Lande & Glenny

[57] ABSTRACT

An alarm system for vehicles or the like responsive to unauthorized tampering. The circuitry includes at least two sensor arrays, each adapted to produce a signal responsive to tampering of a particular kind. In the case of an automobile, one sensor array is responsive to the opening of the trunk or hood, and its signal immediately actuates an alarm, such as sounding the horn; another sensor array, responsive to movement of the vehicle or opening of a door, produces a signal which, after a time delay of, say, 15 seconds, actuates the alarm. Another time delay circuit turns off the alarm after, say, 25 seconds. The circuitry includes arming means incorporating a third time delay, by which to arm the system after a delay of, say, one minute following the turning off of the ignition switch. The sensor responsive to the opening of the vehicle door can conveniently be connected to one terminal of the courtesy light conventionally lighted by the door opening, and the circuitry includes means adapting it to use with courtesy lights of either of the two major systems in present use, whether one terminal of the courtesy light is permanently grounded, or connected to the 12 volt source.

6 Claims, 2 Drawing Figures

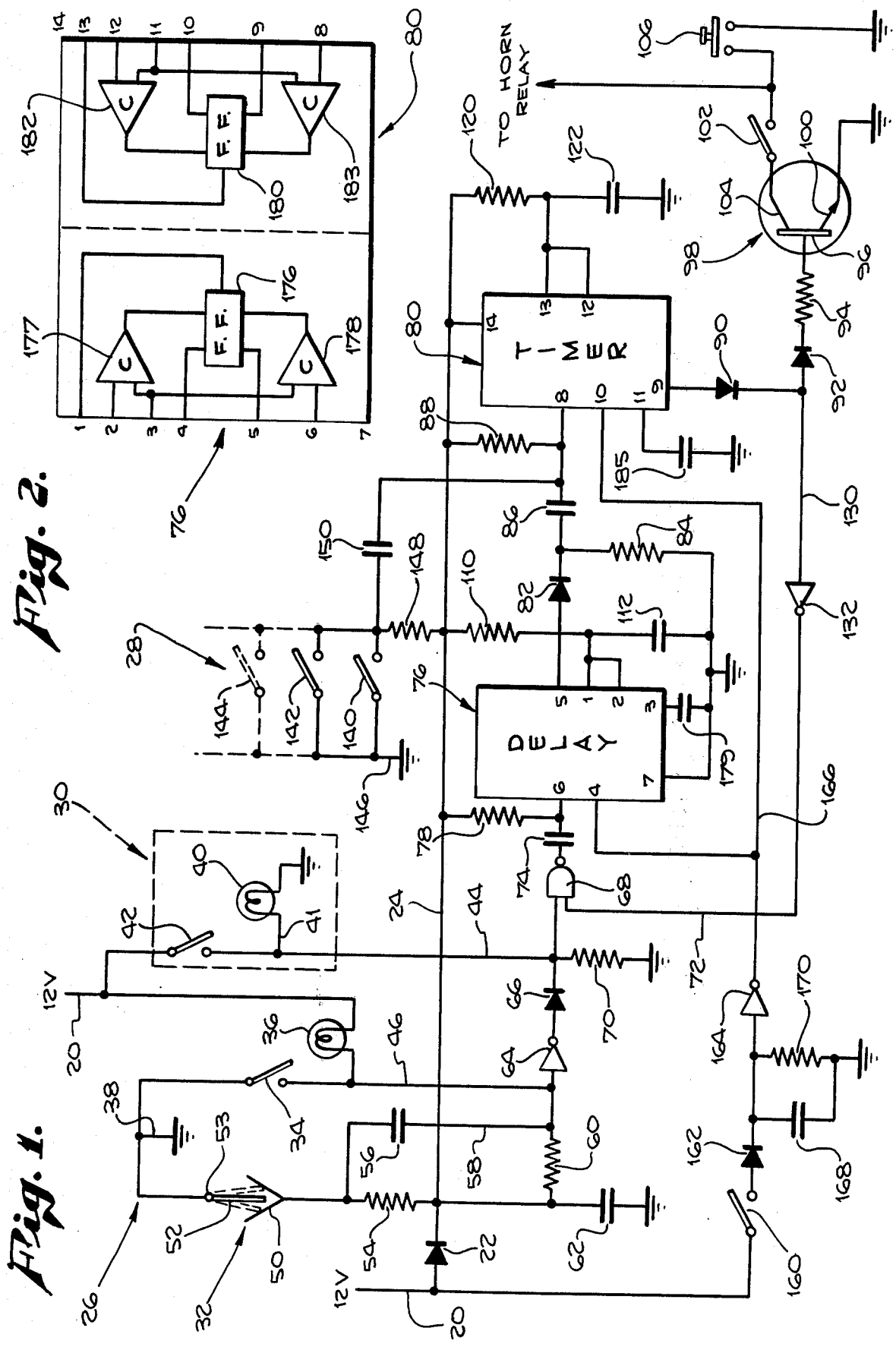
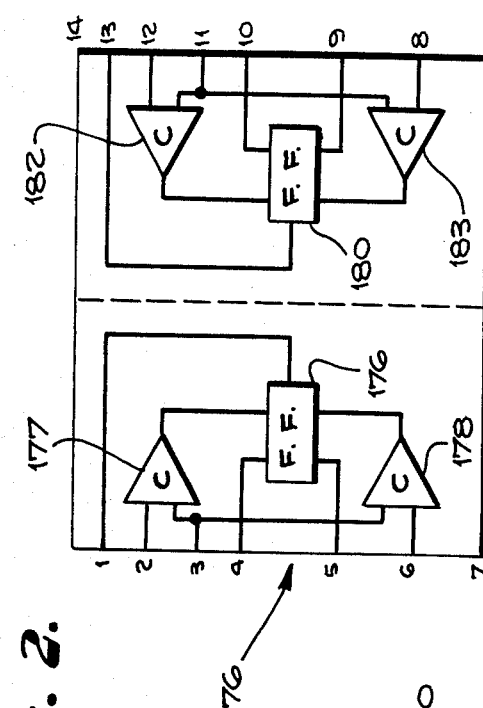
Fig. 1.
Fig. 2.

VEHICLE ALARM SYSTEM

BACKGROUND AND FIELD OF THE INVENTION

The present invention relates generally to alarm systems for protection of property, and more particularly to such a system for sounding an alarm such as the horn of a vehicle, when the vehicle is tampered with.

In the preferred form of the invention hereinafter described in detail, there is provided circuitry comprising an electrical system powered by the battery of a vehicle for sounding the vehicle's horn, either immediately upon the opening of the hood or trunk of the vehicle, or following a time delay of about 15 seconds after opening one of the doors or subjecting the vehicle to motion, such as tilting or shaking it. The circuitry includes means for stopping the alarm after a predetermined period, which may be about 25 seconds. The circuit is not armed until the end of a predetermined interval, about one minute, after the user has turned off the ignition. This provides ample time for the user and passengers to leave the vehicle and close the doors before the system is armed. The circuitry includes a master switch by which to disable the system, as when the vehicle is to be driven by someone not familiar with the system, such as an attendant in a garage or parking lot.

It is accordingly the principal object of the invention to disclose a novel alarm system for use in protecting a vehicle. Other objects and purposes are to provide such a system which, when armed, sounds an alarm immediately upon the occurrence of certain kinds of tampering such as opening of the hood or trunk, and sounds an alarm at the end of a predetermined time interval after the occurrence of other kinds of tampering such as opening a door of the vehicle or shaking or otherwise moving the vehicle; to provide, in such a system, means for stopping the sounding of the alarm after a length of time sufficient to frighten away a would-be thief; to provide such a system which is in unarmed condition as long as the ignition switch is on and for about one minute after that switch is turned off; to provide such a system including a master switch for disabling the system when desired; and for additional objects and purposes as will be understood from a reading of the following description of a preferred embodiment of the invention taken in connection with the accompanying drawings.

BRIEF DESCRIPTION OF THE DRAWING

FIG. 1 is a schematic circuit diagram of an alarm system in accordance with the invention.

FIG. 2 is a block diagram of a dual timer of conventional design, which is advantageously used in the invention.

DETAILED DESCRIPTION

Referring now in detail to the drawing, and first to FIG. 1, an alarm system in accordance with the present invention is shown as used with a vehicle such as an automobile having a 12 volt electrical system, with the negative side grounded. Thus 12 volt power in line 20 is fed through diode 22 to line 24, from which it is distributed to appropriate components of the circuitry, as will be later described. In the present illustrative embodiment of the invention there are provided two sensor arrays responsive to unauthorized tampering with the vehicle. One such array produces a signal which is subjected to a time delay of, say, 15 seconds before causing the system to sound the alarm; the signal from the other sensor array causes the alarm to be sounded immediately. Thus the first sensor array is responsive to an event which may be innocent, such as the opening of one of the doors of the vehicle by the owner or other authorized person. The time delay associated with the sensing of such an event permits the authorized person to enter the vehicle and disable the alarm circuitry by means to be described.

In FIG. 1 sensor arrays of the first and second type just described are indicated generally at 26 and 28 respectively. Another sensor, enclosed within dotted outline indicated generally at 30, has a special purpose to be described later.

Sensor array 26 includes a sensor responsive to shaking or other movement of the vehicle, such sensor being indicated generally at 32; sensor array 26 also includes a sensor responsive to the opening of a door of the vehicle, here shown as including a normally open switch having a blade 34. This switch, when closed as by the opening of the vehicle door, illuminates the conventional courtesy light 36, one of whose terminals is connected to the 12 volt supply 20, and the other of whose terminals is grounded at 38.

In some vehicles presently manufactured, the courtesy light has one of its terminals fixed to ground, and opening of the vehicle door serves to apply 12 volt power to the other terminal of the courtesy light. A characteristic of the present invention is that it is readily adapted for use in such vehicles. With reference to the circuitry within dotted outline 30, one terminal of courtesy light 40 is grounded as shown, and the other terminal 41 is connected to the 12 volt supply 20 through switch 42 when the latter is closed, by opening the vehicle door.

As will be later understood, closing of switch 42 produces a positive-going pulse in line 44, while closing of switch 34 produces a negative-going pulse in line 46. Either of such pulses serves to trigger the beginning of a time delay of, illustratively, 15 seconds, at the end of which the alarm sounds.

Motion sensor 32 is schematically shown as a tilt switch having a conical electrode 50 and a pendulum electrode 52 pivotally mounted at 53 for free movement within conical electrode 50, which is normally held at 12 volts through resistor 54. Any movement sufficient to cause pendulum electrode 52 to swing to its dotted line positions will ground conical electrode 50, at least momentarily. This sends a pulse through capacitor 56 to line 58, which is normally held at 12 volts through resistor 60 to line 24, the latter being connected to one plate of grounded capacitor 62.

Sensor 32 is normally open, and closes on being disturbed. Alternatively, a normally closed motion sensor may be used, of the type which momentarily opens upon disturbance. Resistor 54 is of a high value, desirably of the order of 100K ohms, so the current drain at rest is negligible.

A pulse in either line 46 or line 58 is fed to the input of an inverter 64 and diode 66 to one input terminal of NAND gate 68, that terminal being normally at ground potential through resistor 70. Gate 68, when enabled by a positive signal in line 72 in a manner to be described later, responds to an input pulse by feeding an output pulse of opposite polarity through capacitor 74 to pin 6 of a delay network indicated generally at 76. Pin 6 is normally maintained at 12 volts through resistor 78.

Time delay 76 and a timer indicated generally at 80 are here illustratively shown as twin components of a dual timer, available on the market under the trade designation NE556. That particular timer is conveniently useable in the practice of the present invention and is furnished in a 14-pin package, the block diagram of the dual timer being shown in FIG. 2. That timer will be described in connection with its use in the present invention, making reference to its pin numbers, although it will be readily understood that other types of timing circuits could be used in the invention.

With continuing reference to time delay 76, it will be seen that output pin 5 is normally held at ground potential through diode 82 and resistor 84. The output of pin 5 is fed via diode 82 to one plate of a capacitor 86, whose other plate is normally held at 12 volts through resistor 88. As previously explained, when a tampering is sensed by one of the sensors of sensor array 26, or by sensor 30, the circuitry feeds a negative-going pulse to trigger pin 6 of delay 76. After a predetermined time delay, illustratively 15 seconds, the circuitry within time delay 76 drives output pin 5 to a positive value approximating 12 volts. This voltage is momentarily effectively added to the voltage across capacitor 86, and the resulting potential of approximately 24 volts is impressed on trigger pin 8 of timer 80. Through the circuitry of timer 80, this pulse to trigger 8 produces a positive signal at output pin 9 of the timer, and the output signal is fed via diodes 90 and 92 and resistor 94 to the base 96 of a transistor indicated generally at 98, serving as a switch. It will be noted that emitter 100 of the transistor is grounded and, when master switch 102 is closed, the transistor emitter 104 is connected to the negative end of the horn relay of the vehicle in which the present invention is mounted. As will be readily understood, the horn is normally actuated by the user's depression of horn push button 106, thus grounding that end of the horn relay and causing the horn to sound. By the same token, driving the transistor base 96 positive turns on the transistor switch, similarly grounding the horn relay and causing the horn to sound.

The time delay functions of delay 76 and timer 80 will now be explained, with reference first to time delay 76. It will be seen that pins 1 and 2 are tied together, and are normally held at 12 volt potential through resistor 110. That resistor and grounded capacitor 12 are the operative components of an RC time constant circuit effectively determining the delay interval following the triggering of pin 6 until producing a positive pulse at output pin 5. More specifically, triggering of pin 6 momentarily drives pins 1 and 2 to ground potential, thus discharging capacitor 112. That capacitor immediately begins to recharge through resistor 110, eventually producing an output pulse at pin 5, and that pulse is fed to trigger pin 8 as previously described.

With reference to timer 80, it will be noted that pins 12 and 13 are tied together and, under steady state conditions, are held at a potential of 12 volts through resistor 120. Those pins are also connected to one plate of a grounded capacitor 122. The pulse fed to trigger pin 8 not only produces an output signal at pin 9 as previously described, but also momentarily drives pins 12 and 13 to ground potential, thus discharging capacitor 122. That capacitor commences to recharge through resistor 120, these two components thus constituting the RC time constant circuit applicable to the operation of timer 80.

Thus the potential of pins 12 and 13 will eventually approach 12 volts, at which time the circuit ceases to furnish an output signal to pin 9, and switching transistor 98 is thus turned off, and the sounding of the horn ceases.

Means may be provided in accordance with the invention for preventing a second activation of time delay 76 during the time that timer 80 is producing an output signal at pin 9, and the horn alarm is thus sounding. In the present embodiment of the invention, such means include a line 130 fed by the output of diode 90 through an inverter 132 to line 72 previously mentioned as one of the two inputs to NAND gate 68. Thus, when output pin 9 of timer 80 is positive and the horn alarm is hence sounding, the inverted output of pin 9, via line 72, disables gate 68. By the same token, when output pin 9 is at ground potential, the signal in line 72 enables gate 68, so that it will be responsive to a signal from one of the sensors whose operation has been previously described.

Additional sensor means are also provided in accordance with the invention for immediately causing the circuitry to commence sounding the horn alarm. Thus sensor array 28 previously mentioned includes one or more normally open switches, of which two are indicated at 140 and 142 in solid lines, with a third switch 144 shown in dotted line, suggesting that as many more such switches may be used as the vehicle owner may desire. Typical locations for such switches includes the trunk and the hood of the vehicle. Each switch is normally open, and is accordingly mounted in connection with, for example, the hood, so that when the hood is in its normal closed position, the associated switch is open; but the switch closes when the hood is opened, giving evidence of unauthorized tampering with the vehicle.

More specifically, the switches of sensor array 28 are grounded at one end 146. The other ends of the switches of this array are connected through resistor 148 with the 12 volt source in line 24, as well as to one plate of a capacitor 150, whose other plate is connected to trigger pin 8 of timer 80. As will be evident, the closing of any of the switches 140, 142, 144 immediately grounds the upper end of resistor 148 as seen in FIG. 1, thus creating a pulse through capacitor 150 applied to trigger pin 8. That pin having been triggered, the circuitry of timer 80 immediately provides a positive output signal at pin 9 which, as previously described, turns on the horn alarm and commences the timing period determining the duration of the alarm by reason of the RC time constant circuit including resistor 120 and capacitor 122.

It was previously pointed out that switch 102 constitutes, in effect, the master switch of the circuitry, preventing sounding of the horn alarm when it is open. In addition, means are provided in accordance with the invention for inhibiting operation of the circuitry when the ignition switch of the vehicle is on, and for a predetermined time interval of approximately one minute after turning the ignition off. More specifically, an ignition switch indicated generally at 160 is shown in its off position. When the ignition is on and this switch consequently closed, the 12 volt source in line 20 is applied through diode 162 to the input of an inverter 164, whose output in line 166 is fed to pins 4 and 10 of delay 76 and timer 80 respectively. Each of those pins constitutes a reset terminal of the respective flip-flop in the timing circuitries, thereby preventing actuation of the alarm sounding circuitry of the invention. Means are provided in association with ignition switch 160 for maintaining the inhibiting signal in line 166 for an interval after the owner has turned off the ignition by opening switch 160. In the present form of the invention, such means include a capacitor 168 and a resistor 170 connected between the output of diode 162 and ground. The RC circuit provided by these two components maintains a positive input voltage to inverter 164, and thus an inhibiting low voltage output of that inverter, for a relatively long period of time, illustratively one minute. This permits the owner or other authorized user and his passengers, after switch 160 is opened by turning off the ignition, sufficient time to exit the vehicle without causing one of the sensors to commence sounding the alarm. It will be understood that the ignition switch may, as is conventional, have an accessory terminal for continuing to supply power to a heater, radio or the like after the ignition proper is turned off. Switch 160 may represent that accessory terminal.

Referring to FIG. 2, it will be seen that the circuitry of delay 76 includes flip-flop 176 and comparators 177 and 178, the latter having a common input at pin 3, which (FIG. 1) is connected to one plate of grounded filter capacitor 179. Similarly, the circuitry of timer 80 includes flip-flop 180 and comparators 182 and 183, the latter having a common input at pin 11, connected to one plate of grounded filter capacitor 185.

In an operative embodiment of the invention, typical values in ohms of the several resistors are: resistor 60=1.5 K; resistors 70, 78, 84, 88, 94 and 148=2 K; resistor 54=100 K; resistor 110=1.5 M; resistor 120=2.4 M; and resistor 170=8.2 M. Similarly, typical values in farads of the several capacitors are: capacitors 179 and 185=0.01 mfd; capacitors 62, 78, 86 and 150=0.1 mfd; and capacitors 56, 112, 122 and 168=10 mfd. Obviously other values are usable as may be desired, particularly as to the elements forming components of the several RC time constant circuits, in order to provide preferred time delays.

Other modifications and changes not departing from the scope of the invention as defined in the appended claims are intended to be embraced thereby.

What is claimed is:

1. In a vehicle alarm system responsive to any of a plurality of tamperings, in combination:
    inverter means having an input terminal for receiving a tampering-produced first signal of a given polarity and producing therefrom a second signal of opposite polarity;
    time delay means adapted to receive said second signal or a tampering-produced third signal of said opposite polarity and, after a predetermined time interval, producing therefrom a fourth signal;
    and means adapted to receive said fourth signal or a fifth tampering-produced signal and producing therefrom an alarm signal.

2. The invention as defined in claim 1 including timing means for terminating the alarm signal after a predetermined duration.

3. The invention as defined in claim 1 adapted for use in an automobile having an ignition switch and including means activated when the ignition switch is in its operative condition for preventing production of the alarm signal.

4. The invention as defined in claim 3 including time delay means associated with the preventing means for continuing to prevent production of the alarm signal during a predetermined interval after the ignition switch is moved to its inoperative condition.

5. The invention as defined in claim 1 including means actuated by the existence of the alarm signal for preventing said time delay means from receiving said second or third signal.

6. The invention as defined in claim 1 including sensor means responsive to vehicle movement for producing said first signal.

* * * * *